United States Patent Office 2,822,518
Patented Feb. 4, 1958

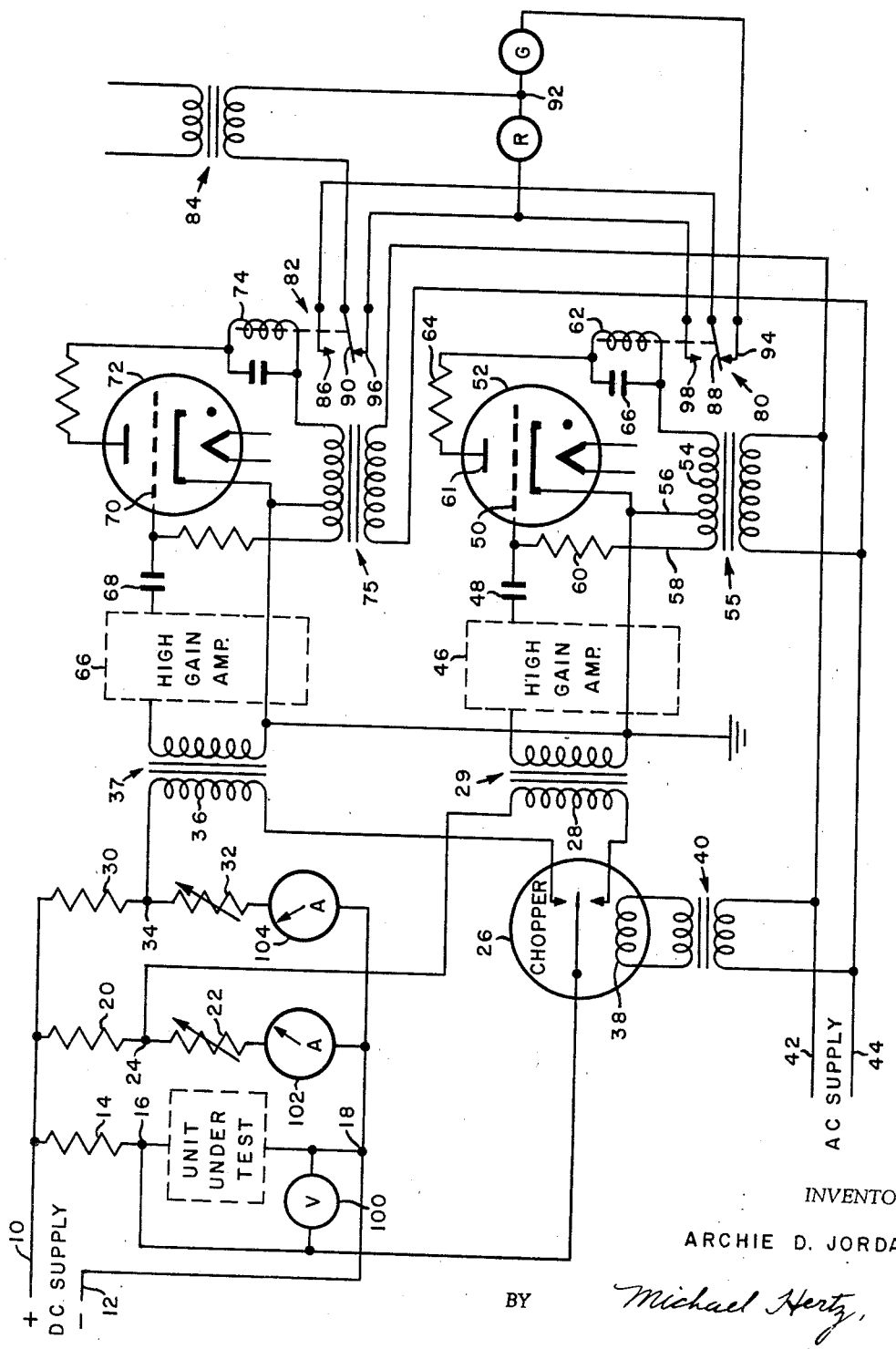

2,822,518
TESTING CIRCUIT

Archie D. Jordan, Emporium, Pa., assignor to Sylvania Electric Products Inc., a corporation of Massachusetts Application November 21, 1956, Serial No. 623,617

6 Claims. (Cl. 324—62)

This invention relates to electrical testing equipment which determines whether the current carried by an electrical device or unit under test is within predetermined limits.

An object of the invention is to make the testing equipment very simple and such as not to require the operator to operate any switches or the like to perform the test.

Another object of the invention is to make the testing device reliable in operation.

These and other objects will become apparent upon consideration of the following specification when taken in conjunction with the accompanying drawing in which the figure shows a wiring diagram of the testing equipment.

Referring to the drawing in greater detail, at 10, 12 there is indicated a pair of direct current supply lines and for convenience of description, the line 10 may be regarded as positive. Connected across the lines is a Wheatstone bridge arrangement comprising a resistor 14, and a unit under test, said unit being connected to the terminals 16 and 18, a second pair of series connected resistors 20 and 22 having a common point 24 and a sensing circuit involving a series connected switching arrangement or chopper 26 and the primary 28 of a transformer 29, this sensing circuit bridging point 16 and point 24. A second series connected pair of resistors 30 and 32 with a common juncture point 34 bridges the line 10, 12. The point 34 leads to the primary 36 of a second transformer 37 and the other end of the primary is connected to the chopper 26. The chopper is a single pole double throw switch electromagnetically operated as by a coil 38 through which an alternating current flows, which current may be derived from a step down transformer 40 connected to a sixty cycle alternating current supply line 42, 44.

For convenience in operation of the equipment, the resistors 14, 20 and 30 may all be made of equal value, and all of them may be variable.

The transformer 29 through its secondary, feeds a pulse traversing coil 28 to a high gain amplifier 46 which amplifies the pulse and feeds it via condenser 48 to the grid 50 of a gas filled tube 52 normally biased to cut off. The bias may be obtained through the secondary coil 54 of a transformer 55 by connecting one lead 56 between the cathode of the tube and an intermediate turn of the secondary and by connecting another lead 58 to an end of the secondary and via a resistor 60 to the grid 50. The other end of the secondary is connected to the anode 61 of the tube 52 via a relay coil 62 and current limiting resistor 64, the relay coil being shunted by a condenser 66 designed to prolong the holding action of the coil. The transformer 55 is connected to the same source of alternating current as is the transformer 40. As the right hand end of secondary 54 swings positive and the tube could become conductive, the lead 58 becomes negative normally inhibiting the firing of the tube 52. On the negative swing of the right hand and of the secondary, no current can pass through the tube since the anode is then negative with respect to the cathode. However, while the anode is on the positive swing, should a positive pulse of sufficient magnitude be passed by condenser 48, the negative bias on the grid of the tube created by the secondary of transformer 55 will be overcome and the tube will become temporarily conductive. The tube will be extinguished as the alternating current goes through its cycle in the transformer 55, as will be understood.

Similarly a pulse delivered from the primary of transformer 36 through the transformer 37 will be delivered to a high gain amplifier 66, condenser 68 and grid 70 of gas filled tube 72 which, like tube 52, controls the action of a relay whose coil is indicated at 74. There is a transformer 75 similar to transformer 55 connected to the gas filled tube 72 so as to supply current and grid bias thereto, and the transformers 55 and 75 are phased so as to supply positive potential to the anodes of their respective tubes as the chopper 26 closes the circuit to the associated grids. The chopper 26 is a vibratory switch operated in synchronism with the alternating current supply. The relays 62 and 74 may operate switches 80 and 82 connected to any form of mechanism to control the disposition of the unit under test. However, there is illustrated a circuit operated by the switches to control colored signal lights to indicate to the operator when a unit is or is not acceptable. The colored lights are here illustrated as a red light R and a green light G energized thru the transformer 84 under contact of the switches 80 and 82. The wiring, in one form of the invention, is as follows: The upper stationary contact 86 of switch 82 is directly connected to the movable arm 88 of switch 80. The movable arm 90 of switch 82 is connected to the transformer 84 and via the transformer to a tap 92 between the lamps R and G. The other side of lamp G is connected to the bottom contact 94 of switch 80 and the other side of lamp R is connected to the bottom contact 96 of switch 82 and the top contact 98 of switch 80. For convenience in operation of the system, a voltmeter 100 bridges the points 16 and 18 and ammeters 102 and 104 are interposed, respectively, in each of the other legs of the Wheatstone bridges.

Considering the operation of the system, let it be assumed that resistors 14, 20 and 30 are all made equal. Therefore, if the same current were to flow through them the voltage drop across them would be equal. Resistor 22 is adjusted so that when in series with resistor 20, the current passing through them will equal the desired maximum current at the same voltage and resistor 32 is set so that the current passing thru the resistors 30 and 32 will equal the desired minimum. If the unit under test be an electron tube, the anode would be connected to the point 16, since line 10 is here considered as positive, and the cathode would be connected to point 18. The direct current supply is set so that the desired potential is obtained across the tube. All settings are made just once for any particular type of unit under test and successive tests of units of the same type may be made without further adjustments.

When no unit is under test, reference point 16 is positive with respect to points 24 and 34 and pulses are sent through primary windings 36 and 28 of transformers 27 and 29 by way of chopper 26. The pulses are phased so that the grids are negative when the anodes are positive and tubes 72 and 52 do not conduct. When tubes 72 and 52 do not conduct arms 88 and 90 of switches 80 and 82 are closed on contacts 94 and 96. The red lamp is energized.

When a unit under test draws less than the desired minimum current reference point 16 is positive with respect to reference points 24 and 34 and conditions are the same as if there was no unit under test.

When a unit under test draws more than the minimum desired current but less than the maximum desired current reference point 16 is positive with respect to reference point 24 but negative with respect to reference point 34. The pulses sent through primary winding 28 of transformer 29 are not changed in direction but the pulses through primary winding 36 of transformer 37 have been changed in direction because reference point 16 is now negative with respect to reference point 34. These pulses now cause grid 70 to be positive when the anode of tube 72 is positive and tube 72 conducts. Relay 74 closes arm 90 on contact 86 and the green lamp circuit is closed while the red lamp circuit is opened. The green lamp indicates a unit drawing current between the minimum and maximum limits.

When a unit under test draws more than the maximum desired current reference point 16 is negative with respect to reference points 24 and 34. Pulses sent through primary windings 36 and 28 are now phased so that the pulses drive grids 70 and 50 of tubes 72 and 52 positive when the anodes are positive and both tubes conduct. Therefore both relays 80 and 82 are energized and arm 88 of relay 80 contacts upper contact 98 while arm 90 of relay 82 contacts upper contact 86. Under these conditions only the red lamp is energized.

It is obvious that when a unit under test draws just enough current to cause reference points 16 and 34 to be at the same potential there are no pulses sent through primary winding 36 and neither relay 74 nor relay 62 is energized and the red lamp is energized. It is also obvious that when a unit under test draws just enough current to cause reference points 16 and 24 to be at the same potential reference point 16 is negative with respect to point 34 in which case tube 72 is conducting, but tube 52 is not. Therefore, the green lamp is energized.

Having thus described the invention, what is claimed as new is:

1. A testing equipment comprising a direct current supply line comprising a pair of wires, a voltage dropping element connected to one wire and to a terminal, the latter forming a voltage reference point, a second terminal connected to the other wire of the pair, said terminals being provided for connection to the terminals of a unit to be placed under test, a pair of series connected voltage dropping devices connected across the wires, the connection between said devices forming a second voltage reference point, a pulse forming network including means for periodically making and breaking the circuit connected across the two reference points, and a load circuit forming the output of the pulse forming network.

2. A testing equipment comprising a direct current supply line comprising a pair of wires, a voltage dropping element connected to one wire and to a terminal, the latter forming a voltage reference point, a second terminal connected to the other wire of the pair, said terminals being provided for connection to the terminals of a unit to be placed under test, a pair of series connected voltage dropping devices connected across the wires, the connection between said devices forming a second voltage reference point, a pulse forming network connected across the two reference points, a load circuit forming the output of the pulse forming network, said load circuit comprising a gas filled tube having an anode, a grid and a cathode, the grid and cathode of said tube being fed with voltages of opposite polarity from the pulse forming network, an alernating current supply, means coupled with said alternating current supply for applying an alternating current biasing voltage to said grid with respect to the cathode, further means coupled with the alternating current supply and in phase with said biasing voltage for applying an alternating current to the anode and cathode of the tube, and an output circuit connected to said anode and cathode.

3. A testing equipment comprising a direct current supply line comprising a pair of wires, a voltage dropping element connected to one wire and to a terminal, the latter forming a voltage reference point, a second terminal connected to the other wire of the pair, said terminals being provided for connection to the terminals of a unit to be placed under test, a pair of series connected voltage dropping devices connected across the wires, the connection between said devices forming a second voltage reference point, a pulse forming network connected across the two reference points, a load circuit forming the output of the pulse forming network, said load circuit comprising a gas filled tube having an anode, a grid and a cathode, the grid and cathode of said tube being fed with voltages of opposite polarity from the pulse forming network, an alternating current supply, means coupled with said alternating current supply for applying an alternating current biasing voltage to said grid with respect to the cathode, further means coupled with the alternating current supply and in phase with said biasing voltage for applying an alternating current to the anode and cathode of the tube, and an output circuit connected to said anode and cathode, said pulse forming network including a switch controlled by the alternating current supply and closed in phase with the application of positive potential to the anode of the tube.

4. A testing equipment comprising a direct current supply line comprising a pair of wires, a voltage dropping element connected to one wire and to a terminal, the latter forming a voltage reference point, a second terminal connected to the other wire of the pair, said terminals being provided for connection to the terminals of a unit to be placed under test, a pair of series connected voltage dropping devices connected across the wires, the connection between said devices forming a second voltage reference point, a second pair of series connected voltage dropping devices connected across the wires, the connection between said last devices forming a third voltage reference point, a pulse forming network connected across the first and second reference points, a second pulse forming network connected across the first and third reference points, said networks including, in common, a switching mechanism to energize the networks in alternation, and load circuits forming the outputs of the pulse forming networks.

5. A testing equipment comprising a direct current supply line comprising a pair of wires, a voltage dropping element connected to one wire and to a terminal, the latter forming a voltage reference point, a second terminal connected to the other wire of the pair, said terminals being provided for connection to the terminals of a unit to be placed under test, a pair of series connected voltage dropping devices connected across the wires, the connection between said devices forming a second voltage reference point, a second pair of series connected voltage dropping devices connected across the wires, the connection between said last devices forming a third voltage reference point, a pulse forming network connected across the first and second reference points, a second pulse forming network connected across the first and third reference points, said networks including, in common, a switching mechanism to energize the networks in alternation, and load circuits forming the outputs of the pulse forming networks, said load circuits each including a gas filled tube having an anode, a grid and a cathode, the grid and cathode of each said tube being fed with voltages of opposite polarity from its respective network, an alternating current supply, means coupled with said supply for applying an alternating current biasing voltage to said grids with respect to their cathodes, further means coupled with said supply and in phase with the biasing voltage for applying an alternating current to the anodes and cathodes of said tubes, and an output current connected to the anode and cathode of each tube.

6. A testing equipment comprising a direct current supply line comprising a pair of wires, a voltage dropping element connected to one wire and to a terminal, the latter forming a voltage reference point, a second terminal connected to the other wire of the pair, said terminals being provided for connection to the terminals of a unit to be placed under test, a pair of series connected voltage dropping devices connected across the wires, the connection between said devices forming a second voltage reference point, a second pair of series connected voltage dropping devices connected across the wires, the connection between said last devices forming a third voltage reference point, a pulse forming network connected across the first and second reference points, a second pulse forming network connected across the first and third reference points, said networks including in common a switching mechanism to energize the networks in alternation, and load circuits forming the outputs of the pulse forming networks, said load circuits each including a gas filled tube having an anode, a grid and a cathode, the grid and cathode of each said tube being fed with voltages of opposite polarity from its respective network, an alternating current supply, means coupled with said supply for applying an alternating current biasing voltage to said grids with respect to their cathodes, further means coupled with said supply and in phase with the biasing voltage for applying an alternating current to the anodes and cathodes of said tubes, and an output circuit connected to the anode and cathode of each tube, said switching mechanism including a single pole double throw switch whose pole is controlled by said alternating current supply and whose contacts are closed in phase with the application of positive potential to the anodes of the tubes.

References Cited in the file of this patent
UNITED STATES PATENTS 2,667,970     Bregar _____ Feb. 2, 1954